Jan. 19, 1971    W. SCHRAMM    3,555,836
PROCESS AND APPARATUS FOR THE SEPARATION OF HYDROCARBONS WITH
SIMULTANEOUS PRODUCTION OF ACETYLENE
Filed Feb. 9, 1968
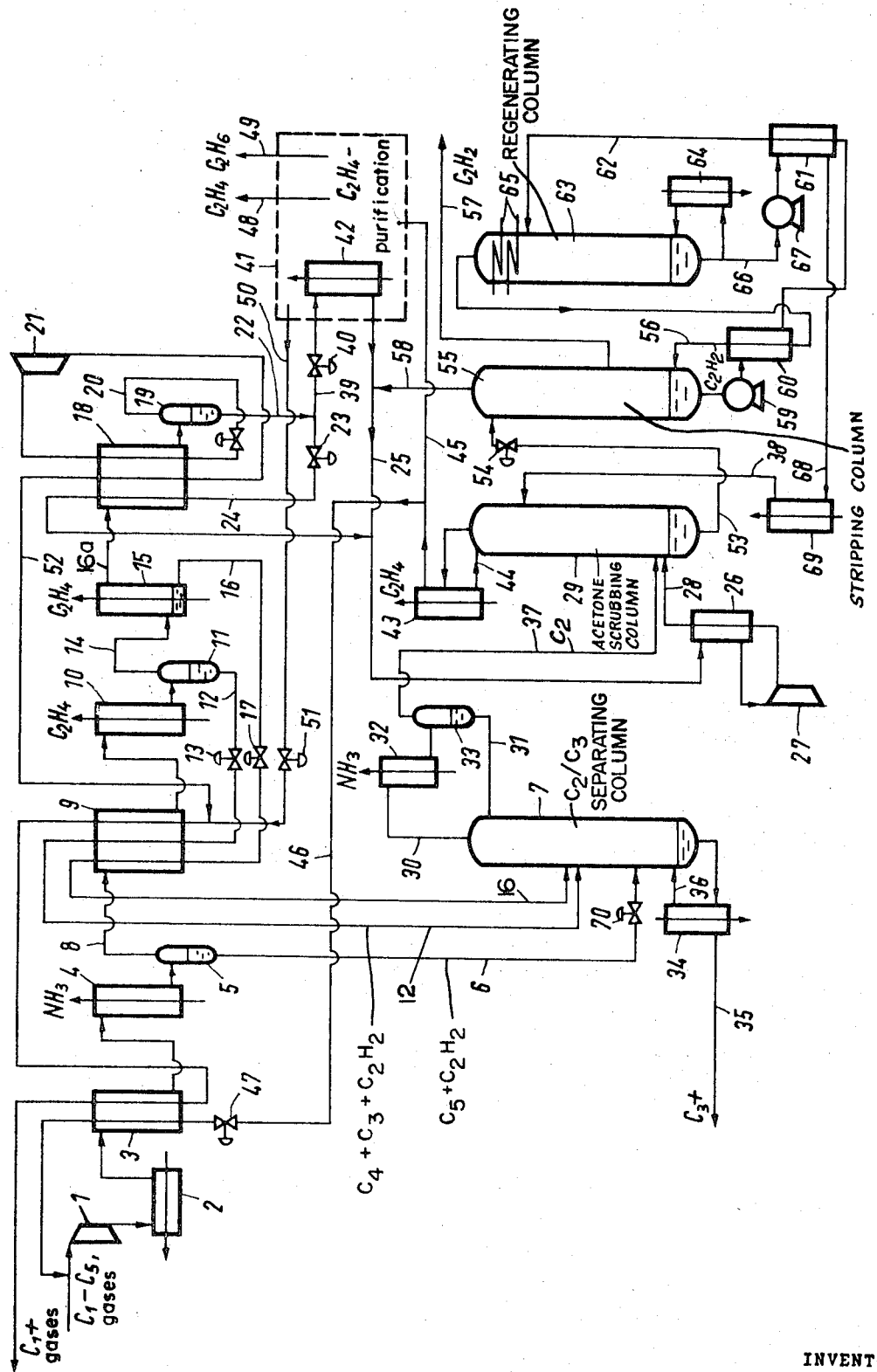
INVENTOR
WALTER SCHRAMM
BY L. William Miller
ATTORNEY

United States Patent Office 3,555,836
Patented Jan. 19, 1971

3,555,836
PROCESS AND APPARATUS FOR THE SEPARATION OF HYDROCARBONS WITH SIMULTANEOUS PRODUCTION OF ACETYLENE
Walter Schramm, Munich, Germany, assignor to Linde Aktiengesellschaft, Hoelleriegelskreuth, Germany
Filed Feb. 9, 1968, Ser. No. 704,487
Claims priority, application Germany, Feb. 13, 1967,
L 55,729
Int. Cl. F25j 1/00, 3/00
U.S. Cl. 62—9
12 Claims

ABSTRACT OF THE DISCLOSURE

A process and apparatus for separating acetylene-rich gaseous mixture consisting essentially of $C_1$- to $C_5$-hydrocarbons and inert gases. The mixture is passed through a plurality of preliminary cooling stages of decreasing temperature to condense out the higher hydrocarbons and fractions of acetylene at each stage. The major portion of the $C_2$-hydrocarbons, including the remaining acetylene, is condensed out in a low temperature cooling stage. The condensates are further separated in separating and low temperature scrubbing steps to produce acetylene-free and acetylene-enriched fractions. Engine expansion of the methane and inert gases and throttle expansion of a liquid fraction is utilized to produce a portion of the refrigeration required for the separation processes.

BACKGROUND OF THE INVENTION

There are conventional processes available for separation of hydrocarbon mixture such, for example, as that disclosed in German Pat. 1,140,926, wherein the compressed gaseous mixture, free of $CO_2$ and $H_2S$, is first separated into three fractions in a preliminary cooling stage at about 230° K., and a low-temperature cooling step at about 155° K. The resultant condensate is introduced into a $C_2/C_3$-column for rectification therein.

The components of the hydrocarbon mixture remaining in the gaseous phase from the preliminary cooling stage are partially condensed in another low-temperature cooling stage and the condensate therefrom is introduced into a $CH_4$-column together with the head product of the $C_2/C_3$-column. The remaining portion of the hydrocarbon mixture remaining in the gaseous phase during the low-temperature cooling step is removed from the line and not further processed.

The sump product of the $CH_4$-column, consisting of $C_2$-hydrocarbons, is then passed through a column to free the product from ethane and the residual ethylene and acetylene are separated in an acetone washing stage. In addition, provision is made to recycle ethane obtained in the last rectification stage into a crude gas compressor to ensure, in the case of processing ethane-poor gases, a sufficient amount of backflow liquid in the $C_2/C_3$-column.

The above process is not suitable for gases which are relatively rich in acetylene (i.e., containing more than 10% of acetylene) since, although an extremely small portion of acetylene is condensed out in the preliminary cooling step at about 230° K., a major portion of acetylene is obtained during the low-temperature cooling at 155° K., thereby producing an enrichment of acetylene at about 40% and above in the condensate. Such high acetylene concentrations create extremely serious safety problems, if the condensate is to be processed further and/or utilized as a refrigeration agent or the like.

It has also been known in prior art processes of this type to produce refrigeration required for the separation of hydrocarbon mixtures partially by throttle expansion of the liquid condensate and partially by engine expansion (meaning expansion with the production of external work) of a gaseous fraction as is disclosed, for example, in German Pat. 909,568. In the conventional processes, a mixture of hydrocarbons is cooled under pressure to a temperature sufficiently low that all hydrocarbons which are to be extracted from the mixture are liquefied. The entire fraction obtained in the liquid phase is then expanded in a throttle and the refrigeration obtained thereby is transferred to accomplish partial liquefaction of the crude gas. The expanded fraction is then recompressed and is finally rectified. The residual component remaining in the gaseous phase during condensation, after a slight warming-up procedure, is subjected to engine expansion, whereupon the refrigeration produced thereby is transferred entirely to the crude gas. This process presents a problem in that expansion of the entire fraction obtained in the liquid phase requires recompression of the full fraction if it is to be subject to further processing, such as rectification, therefore, decreasing the efficiency of the process.

SUMMARY OF THE INVENTION

This invention relates generally to gas separation and more particularly to an improved process and apparatus for separating hydrocarbons from a gaseous mixture.

The invention furnishes a novel process, particularly adapted to separating acetylene-rich hydrocarbon mixtures, which avoids the disadvantages of the prior art by providing multi-stage fractional condensation of the mixture to separate relatively small quantities of the acetylene in separate stages and thereby avoids high concentrations of acetylene in the final condensate.

The invention also provides a process for separation of gaseous hydrocarbon mixtures by fractional condensation of improved efficiency by furnishing a portion of the required refrigeration for condensation through expansion of only part of the liquid fraction product in conjunction with expansion of inert gases and methane.

By limiting the concentration of acetylene in the condensate, this invention further provides an improved process for fractional condensation of acetylene-rich hydrocarbon mixtures in that a liquid fraction of the processed gas may be utilized as a refrigerant producing source since the fraction may safely be expanded and recompressed to provide refrigeration.

The objects are attained in the present invention by conducting the preliminary cooling step in several stages at increasingly lower temperatures and collecting the condensates comprising the $C_3$- and higher hydrocarbons along with small portions of the $C_2$-hydrocarbons separately and combining the separately collected portions for processing together in a rectification column.

In a preferred embodiment of the invention, an acetylene-rich gaseous mixture consisting essentially of $C_1$- to $C_5$-hydrocarbons are precooled in a preliminary precooler under pressure to condense the $C_3$- and higher hydrocarbons together with a minor portion of the $C_2$-hydrocarbons from the gaseous mixture, and then the main quantity of $C_2$-hydrocarbons are condensed out in a subsequent low-temperature cooling step; both condensates are then further separated and the $C_2$-hydrocarbons are additionaly fractionated in a low-temperature scrubbing step to produce acetylene-fee and acetylene-enriched fractions; the required refrigeration being obtained in part by engine expansion of methane and inert gases and by throttle expansion of a liquid fraction of the condensate.

These and other objects of the invention will become better understood to those skilled in the art by reference to the following detailed description when viewed in light of the accompanying drawing.

BRIEF DESCRIPTION OF THE DRAWING

The figure is a schematic representation of an apparatus for conducting the process in accordance with the invention.

DESCRIPTION OF THE PREFERRED EMBODIMENT

The hydrocarbon mixture is cooled in a first precooling stage by lean gas ($CH_4$ and inert gas) and $NH_3$, in a next precooling stage by lean gas and a $C_2H_4$-cycle, and then in a final precooling stage by a further $C_2H_4$-cycle operated at a lower pressure, which concludes the precooling.

The additional cooling of the mixture of inert gases and $C_1$- and $C_2$-hydrocarbons exiting in the gaseous phase from the last precooling stage is carried out in a similar manner as described in German Pat. 909,568. The mixture of methane and inert gases not liquefied in the low-temperature cooling step is engine-expanded in a turbine and the refrigeration produced thereby is utilized in several heat exchangers in the low-temperature cooling stage, as well as in the precooling stages. In contra-distinction to the conventional process, however, in the process of this invention the entire amount of the liquefied hydrocarbons is not employed for the production of refrigeration. Instead, the condensate obtained in the low-temperature cooling stage, only consisting essentially of $C_2$-hydrocarbons, is expanded through a throttle, and the thus-obtained refrigeration is utilized in the low-temperature cooling stage. This expanded condensate, of course, requires recompression before the condensate can be subjected to a washing step. Such recompression is also required in the conventional process, however, as was indicated above, the condensates obtained in the precooling stages are not expanded in this invention to such an extent that a recompression would be necessary before they are rectified in a $C_2$-/$C_3$-column. The condensates, expand only slightly to provide refrigeration for the heat exchangers of the precooling stages and cool still unseparated gas.

Although refrigeration production according to the present invention provides less refrigeration than if all produced condensates were to be extensively expanded, the full refrigeration required for the process is provided by ammonia or ethylene refrigeration cycles which are generally known in the refrigeation technology.

The above described mode of operation provides two advantages: firstly, the recompression of the entire $C_3$- and higher hydrocarbon fractions are avoided, i.e., a compressor is saved, and secondly, the cooling obtained from the external refrigeration cycles can be utilized in a very advantageous manner during further separation of the gaseous mixture as will be described below. This refrigeration, when utilized for the higher temperatures of the preliminary separation process, is less expensive than if required at the lower temperature of the subsequent rectification step.

The manner of conducting the precooling in accordance with this invention provides an additional advantage in connection with the production of refrigeration for the process. For energy reasons, the refrigeration-producing throttle expansion of the entire condensate obtained in the low-temperature cooling stage cannot be eliminated. Consequently, in each case, a recompression of this fraction to the subsequent pressure of separation is necessary. This mode of operation could not be readily employed in connection with prior art processes, such as that of German Pat. 1,140,926, since, as explained above, there would be too great an enrichment of the acetylene in the low-temperature cooling stage in this process if acetylene-rich gases are processed. The safety of the gas separation plant would thereby be seriously endangered if a condensate of this type were to be compressed and heated after throttle expansion to yield refrigeration. Since, in the process of this invention, a substantial portion of the acetylene has already been separated in the precooling stages, this type of refrigeration production can, however, be employed in the process of the present invention.

In another embodiment of the invention, in case of very high acetylene concentrations in the crude gas, use can be made of a still further idea disclosed in German Pat. 1,140,926. In the conventional process, as briefly mentioned above, when processing crude gases of a low ethane content, provision is made to recycle the ethane obtained in the ethane-ethylene column to the crude gas compressor in order to increase the ethane concentration in the crude gas, so that sufficient reflux liquid can be formed in the $C_2$-/$C_3$-column for completely scrubbing out the $C_3$-hydrocarbons. The recycling of a certain fraction to the crude gas is also advantageous in the process of the present invention if the acetylene concentration of the crude gas is very high, although unlike the conventional process, the present process is not concerned with increasing the reflux liquid in the $C_2$-/$C_3$-column, but rather with decreasing the concentration of the acetylene in the crude gas. Thus, the transfer of the basic idea described in the conventional process to the process of the present invention makes it possible to process hydrocarbons having acetylene contents which heretofore were considered as being too high.

The process steps following the precooling, the low-temperature cooling, and the production of refrigeration by means of which individual components of the hydrocarbon mixture are obtained in the pure form, particularly ethylene and acetylene, are known in the art and do not constitute part of the present invention, and therefore need not be elaborated upon in greater detail.

Referring now to the figure, crude gas is compressed in a compressor 1 and is conducted to a water cooler 2. The gas is first cooled in a heat exchanger 3 by a lean gas (methane and inert gas), and then in a heat exchanger 4 by evaporating ammonia supplied from an outside source. From the first precooling stage, the condensate, containing a major portion of the $C_5$-hydrocarbons and acetylene, are collected in a separator 5 and fed by way of a conduit 6 to a $C_2$-/$C_3$-separating column 7. During passage to the column 7, the condensate is somewhat expanded in a throttle valve 70.

In a second precooling stage, the uncondensed portion of the gaseous mixture passes by way of a conduit 8 into a heat exchanger 9 wherein it is cooled by evaporating condensates and lean gas. The cooled gas is then directed into a heat exchanger 10 wherein it is further cooled by evaporating ethylene. From the second precooling stage, the condensate, containing in addition to residual $C_5$-hydrocarbons, a main portion of the $C_4$-hydrocarbons, the $C_3$-hydrocarbons and acetylene is collected in a separator 11. The condensate collecting in the separator 11 is then withdrawn through a conduit 12, expanded to a certain degree in a throttle valve 13, evaporated in the heat exchanger 9, and from there conducted further through the conduit 12 to the $C_2$-/$C_3$-column 7.

A portion of the gaseous mixture not liquefied in the heat exchanger 10 is conducted from the separator 11 to a third precooling stage by way of a conduit 14. This precooling stage comprises a heat exchanger 15 wherein a last precooling step utilizing evaporating ethylene is conducted. The pressure of the ethylene cycle for the heat exchanger 15 is lower than the pressure for the cooling cycle of the heat exchanger 10 so that lower temperatures may be realized in the heat exchanger 15. The heat exchanger 15 is preferably a reflux condenser wherein the $C_3$-hydrocarbons can be separated practically quantitatively, due to the rectifying effect of this type of condenser. The condensate comprising $C_2$- and $C_3$-hydrocarbons including acetylene is withdrawn from the condenser 15 by way of a conduit 16, expanded to a minor extent in a throttle valve 17, evaporated in a heat exchanger 9 and then conducted to the $C_2$-/$C_3$-column 7 by way of the conduit 16.

The expansion conducted in the throttle valves 13, 17 and 70 referred to above yields a pressure which is on the order of 40 to 97% and preferably 60 to 94% of the pressure before throttling.

The $C_1$- and $C_2$-hydrocarbon fraction, exiting in the gaseous phase from the last precooling stage through a conduit 16a is then subjected to a low temperature cooling step in a heat exchanger 18 where the total quantity of the $C_2$-hydrocarbons, together with part of the methane, and the inert gases, is separated in the liquid phase.

The uncondensed components, substantially methane and inert gases, are withdrawn from the separator 19 via a conduit 20, heated in the heat exchanger 18, engine-expanded in a turbine 21, and serve as refrigerant in the heat exchangers 18, 9, and 3. The condensate of the low-temperature cooling stage is withdrawn from the separator 19 via a conduit 22. One portion thereof is expanded in a throttle valve 23, and is then conducted via a conduit 24 to the heat exchanger 18 where this portion gives off the refrigeration resulting from the throttle expansion and is evaporated. Then, the vaporized condensate flows on via the conduit 24 to a conduit 25 leading to a heat exchanger 26, where the gas is further warmed. Thereafter, the gas is compressed in a compressor 27, cooled in the heat exchanger 26 countercurrently to the expanded gas from the conduit 24, and passes via a conduit 28 into an acetone scrubbing column 29.

The condensates obtained in the precooling stages are introduced into the $C_2$-/$C_3$-separating column 7 at different points through the conduits 6, 12 and 16. Conduit 6 carries the highest boiling hydrocarbons produced during the precooling process, while conduit 16 feeds the hydrocarbons having the lowest boiling points. In order to produce the backflow necessary in the column 7, the latter is equipped at its head with two conduits 30 and 31 which are in communication with each other by way of a heat exchanger 32 cooled by evaporating ammonia and a separator 33. For heating the sump of the separating $C_2$-/$C_3$-column 7, a heat exchanger 34, heated with hot water, is provided. The $C_3$- and higher hydrocarbons leave the plant via a conduit 35, while the lower hydrocarbons from the heat exchanger 34 return to the column 7 through a conduit 36.

The portion of the head product of the $C_2$-/$C_3$-column 7 which was not liquefied in the heat exchanger 32 is withdrawn from the separator 33 via a conduit 37 and is fed into the acetone scrubbing column 29. In this scrubbing column, supplied with acetone pumped through a conduit 38, the $C_2$-hydrocarbons are scrubbed, the acetylene being primarily dissolved. The $C_2$-hydrocarbons stem, on the one hand, from the head of $C_2$-/$C_3$-column 7 and, on the other hand, from the condensate of the separator 19, one portion of which, as explained above, is fed through the conduits 22, 24, 25 and 28 to the column 29, whereas the other portion is branched off through a conduit 39, expanded in a throttle valve 40, and conducted to a $C_2H_4$-purification unit 41 indicated in block diagram form. At that point, the liquid gives off its refrigeration with evaporation, to a heat exchanger, illustrated schematically at 42, and then is combined in the conduit 25 with the partial stream conducted through the conduit 24.

The head product of the acetone scrubbing column 29, having a low acetylene content, is subjected to a reflux condensation in a heat exchanger 43; the liquefied portion, mainly scrubbing agent vapors with acetylene dissolved therein, is recycled through a conduit 44 to the head of the column, while a mixture of ethane, ethylene, methane and inert gases is withdrawn through a conduit 45. A part of this mixture is recycled to the crude gas compressor 1 via a conduit 46 after expansion in a throttle valve 47 to give off its refrigeration in the heat exchanger 3. The other part is fed through the conduit 45 to the $C_2H_4$-purification unit 41 where the rectifying separation of the gaseous mixture into pure ethylene, pure ethane and inert gases is conducted in a conventional manner. These two fractions are withdrawn through conduits 48 and 49, whereas the methane and the inert gases are withdrawn through a conduit 50, expanded in a throttle valve 51, combined with the portion of the lean gas fed through the conduit 52 which has been engine-expanded in the expansion turbine 21, and utilized in the heat exchangers 9 and 3 for cooling the crude gas.

The loaded scrubbing agent of the acetone scrubbing unit 29, contains, in dissolved form, about 10% of the hydrocarbons and inert gases fed to this column as well as the entire amount of acetylene. The scrubbing agent is withdrawn through a conduit 53 and introduced into a stripping column 55 by way of a throttle valve 54. In this column, the small amounts of hydrocarbons other than acetylene, dissolved in the acetone, are stripped off with the aid of pure acetylene introduced into the sump of this column through a conduit 56. Pure acetylene exits from the stripping column 55 through a conduit 57, while contaminated acetylene is conducted from the head of this column through a conduit 58 to the conduit 25, from where it is returned into the acetone scrubbing column 29. From the sump of the stripping column 55, the scrubbing agent, loaded only with acetylene at this point, is conducted via a pump 59, heat exchangers 60 and 61 and a conduit 62, to a regenerating column 63, the sump of which is provided with a reboiler 64 heated with hot water. The head of the column 63 is equipped with a cooler 65 from where pure acetylene is conducted through the conduit 56 to the stripping column 55. The regenerated scrubbing agent is conducted to the acetone scrubbing column 29 by way of a conduit 66, a pump 67, the heat exchanger 61, a conduit 68, a heat exchanger 69 and the conduit 38.

By conducting the preliminary cooling of the hydrocarbon mixture in accordance with this invention, in several stages rather than in a single step, an unusual result is obtained in that in three preliminary cooling stages, for example, and particularly in the last two precooling stages, a greater total amount of acetylene is separated than if the precooling process is conducted in a single step, although the precooling step is principally intended to separate $C_3$- and higher hydrocarbons. This result is achieved because the boiling point of acetylene is somewhat higher than that of ethylene and particularly in case of higher acetylene concentrations, approaches the boiling point of the other constituents, for example, propylene.

In the process of this invention, in contradistinction to prior art processes, several precooling stages are provided, and the condensates of each of such stages are collected separately. Thus, each individual precooling stage constitutes a separation of the hydrocarbon mixture entering that stage into a liquid and a gaseous phase and therefore an at least approximate equilibrium between these two phases is attained. By the repeated provision of such an equilibrium, two advantages are effected as compared to piror art processes. Firstly, the gaseous hydrocarbon mixture exiting from the last precooling stage is freed practically completely of $C_3$- and higher hydrocarbons, resulting in an increased purity of the $C_2$-fraction to be processed in scrubbers and rectification columns connected thereafter. Secondly, and more importantly, in acetylene-enriched gases, a sizable separation of acetylene has already taken place in the precooling stages, with the result that the acetylene product is reduced in the subsequent low-temperature cooling stage wherein the $C_2$-hydrocarbons are separated from methane and the inert gases.

A further important advantage is realized by the staged precooling in that the step of preliminary separation of the acetylene before the processing of the hydrocarbon mixture can be omitted, and the separation of acetylene and ethylene can be left for the acetone scrubbing stage at the end. Such separation by scrubbing has been tested and proven to be advantageous in practice in connection with known processes since, as is known, the amount of the solvent employed, in case of a physical scrubbing step, is not proportional to the components to be dissolved, but rather is proportional to the total amount of gas to be scrubbed. This is also true of other washes wherein acetylene is removed by means of polar washing agents such as alcohols, ketones, or esters. This means, of course, in case of a preliminary separation of acetylene by an acetone scrubbing step, for example, that the amount of acetone must be adjusted to the amount of the entire hydrocarbon mixture, whereas, when the acetone scrubbing step is put at the end, as is done in the conventional process, only the $C_2$-fraction must be scrubbed.

The resulting non-liquefied gaseous mixture emitted from the last precooling stage practically freed of $C_3$-hydrocarbons results, in accordance with a specific embodiment of this invention, from condensing in the last precooling stage with a reflux condenser. Due to the special characteristics of construction, a reflux condenser renders a rectifying effect which ensures that the $C_3$-hydrocarbons are scrubbed out of the gas substantially quantitatively.

As was discussed above, this invention finds particular utility in the processing of acetylene-rich gaseous hydrocarbon mixtures containing $C_1$- to $C_5$-hydrocarbons.

Acetylene-rich mixtures, for the purposes of this invention, are mixtures containing in excess of at least about 10% acetylene by volume of the total mixture.

Mixtures suitable for the process of this invention can comprise remaining $C_1$ through $C_5$-hydrocarbons and inert gases present in amounts varying from traces to substantial percentages of the total volume.

The specific temperatures and pressure to which the mixture is subjected at various stages in the processes may be varied in accordance with the requirements and chemical make-up of the particular mixture being treated, however, it has been found that parameters within the following ranges are particularly effective in performing the process of this invention.

Gas Pressure after compression in compressor 1: 12 to 30 atm. abs. and preferably 18 atm. abs.

Precooling:
  Stage 1: 230 to 240° K. and preferably 233° K.
  Stage 2: 185 to 195° K. and preferably 190° K.
  Stage 3: 168 to 179° K. preferably 170° K.
Low Temperature Cooling in heat exchanger 18: 112 to 130° K. and preferably 120° K.

EXAMPLE

As a specific example of a process conducted in accordance with the invention, 100,000 Nm.³/h. (Nm.³ indicating a standard cubic meter of gas, e.g. at 0° C. and 1 atm. abs.) of a gaseous mixture constituted as follows:

|  | Nm.³/h. |
|---|---|
| $H_2$ | 29,628 |
| $N_2$ | 596 |
| CO | 40,560 |
| $O_2$ | 195 |
| $CH_4$ | 3,937 |
| $C_2H_2$ | 7,049 |
| $C_2H_4$ | 6,550 |
| $C_2H_6$ | 499 |
| $C_3H_6$ | 3,644 |
| $C_3H_8$ | 2,397 |
| $C_4$ | 4,338 |
| $C_5$ | 607 | is processed as follows:

Gas pressure after compression in compressor 1: 18 atm. abs.

Precooling:
  Stage 1: 233° K. (approx.)
  Stage 2: 190° K. (approx.)
  Stage 3: 170° K. (approx.)

Low temperature cooling in heat exchanger 18: 120° K. (approx.).

The products of the above process are taken off as follows:

| Location | Total condensate (Nm.³/h.) | Composition |
|---|---|---|
| Precooling: | | |
| First stage (separator 5) | 9,722 | Major portion of $C_5$— and 1,019 Nm.³/h. acetylene. |
| Second stage (separator 11) | 15,535 | Residual $C_5$—, major portion of $C_4$—, a portion of $C_3$— and 3,427 Nm.³/h. of acetylene. |
| Third stage (reflux condenser 15) | 4,598 | Residual $C_4$—, major portion of $C_3$—and 1,328 Nm.³/h. of acetylene. |
| Low temperature cooling (separator 19) | 27,708 | $C_2$—, $CH_4$ and 1,274 Nm.³/h. of acetylene with inert gases. |

A portion of the condensate from the separator 19 (comprising approximately 60 to 90% by volume of the total condensate therein) is expanded to a pressure of about 1 atm. abs. in the throttle valve 23, transmitted to the heat exchanger 18 and subsequently compressed to about 15 atm. abs. in the compressor 27.

As was stated before, further processing of the lower hydrocarbon condensates to separate the acetylene from the $C_2$- and $C_1$-hydrocarbons and inert gases in the scrubbing column 29, the acetylene from the scrubbing agent in the stripping column 55 and to regenerate the scrubbing agent in the regenerating column 63 are well known to those skilled in the art as is demonstrated in "Linde Reports on Science and Technology" No. 3 (1962) pages 21 to 29.

A further detailed reference to this processing is not required herein. The scrubbing agent may comprise acetone or any other agent suitable for the purpose. The operation and processes performed in the purification unit 41 is separating ethylene, ethane and methane and the inert gases are likewise known in the art as illustrated in the above-mentioned citation.

The preceding example can be repeated with similar success by substituting the generically and specifically described reactants and operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims:

What is claimed is:

1. In a process for the separation of an acetylene-rich gaseous mixture consisting essentially of $C_1$- to $C_5$-hydrocarbons and inert gases with simultaneous production of acetylene wherein first the $C_3$- and higher hydrocarbons together with a small portion of the $C_2$-hydrocarbons are condensed out under pressure from the gaseous mixture in a precooling process and the main quantity of $C_2$-hydrocarbons is then condensed out in a low temperature cooling stage, and wherein the refrigeration required for the condensate of the $C_2$, $C_3$ fraction is obtained partially by engine expansion of the methane and the inert gases and partially by throttle expansion of a portion of the liquid condensate, the improvement comprising conducting said precooling process in a series of stages at succeedingly lower temperatures, separately collecting individual condensates comprising $C_3$- and higher hydrocarbons and a minor portion of the $C_2$-hydrocarbons including a fraction of acetylene from each stage, and subsequently, recombining the condensates in a rectification column for further separation to recover as an overhead $C_2$ and acetylene, and scrubbing the overhead to remove the acetylene.

2. A process in accordance with claim 1 wherein said precooling process is conducted in three stages at temperatures in the following ranges:
First stage: 230 to 240° K.;
Second stage: 185 to 195° K.; and
Third stage: 168 to 178° K.

3. A process in accordance with claim 2 wherein the last of said precooling stages is conducted in a reflux condenser.

4. A process in accordance with claim 3 wherein at least one of the individual condensates from said precooling stages is throttle pressure reduced about 40 to 97% of the total pressure and partially evaporated in countercurrent heat exchange with a warmer portion of the gaseous mixture, the liquid phase of said partially evaporated condensate being further processed without recompression.

5. A process in accordance with claim 4 wherein the individual condensates from said precooling stages are directed to said rectification column at different points therein.

6. A process in accordance with claim 5 wherein the condensates having the higher boiling points are introduced into said rectification column at lower points than the condensates having lower boiling points.

7. A process in accordance with claim 6 wherein a portion of the refrigeration required in said precooling process is provided by ammonia and ethylene refrigeration cycles.

8. A process in accordance with claim 1 wherein in at least a portion of the $C_2$-hydrocarbons condensed in said low temperature cooling stage are throttle expanded and brought into heat exchange relationship with the uncondensed hydrocarbons exiting the last of said precooling stages and are subsequently recompressed prior to further processing.

9. A process in accordance with claim 1 wherein a portion of said acetylene-free fraction existing from said low temperature scrubbing stage is recycled to the incoming unfractionated acetylene enriched gaseous mixture.

10. In an apparatus for conducting the process of claim 1 wherein a crude gas compressor is communicative in series with a plurality of first heat exchangers and a last heat exchanger comprising a reflux condenser, the improvement comprising separate and distinct condensate separators in communication with several said first heat exchangers, said separators being tanks free of internal rectification tray means, a gas separating column means communicating each of said separators and the sump of said last heat exchanger with said gas separating column, a gas scrubbing column and means providing communication between said gas separating column and said gas scrubbing column, further heat exchange means after said last heat exchanger for partial condensation of gaseous effluent from said last heat exchanger, a separator communicating with said further heat exchanger for separation of a gaseous component, a pass in said further heat exchanger for reheating said gaseous component, a work expander for expanding the reheated gaseous component, means vaporizing the separated liquid components, a compresser for the vaporized liquid component and means for introducing the vaporized components to said scrubbing column.

11. An apparatus in accordance with claim 10 wherein said means communicating said condensate separators and said sump with said gas separating column further comprise in series an expansion valve for partial expansion of fluid flowing therethrough and a conduit disposed through at least one of the preceding of said first heat exchangers to provide refrigeration therefor.

12. An apparatus in accordance with claim 11 wherein means are further provided to communicate the head of said scrubbing column with the intake side of said crude gas compressor.

References Cited

UNITED STATES PATENTS

| | | | |
|---|---|---|---|
| 2,909,038 | 10/1959 | Williams | 62—17 |
| 2,915,881 | 12/1959 | Irvine | 62—17 |
| 2,956,410 | 10/1960 | Palazzo | 62—17 |
| 3,026,682 | 3/1962 | Palazzo | 62—23 |
| 3,174,292 | 3/1965 | Kasbohm | 62—17 |
| 3,260,057 | 7/1966 | Becker | 62—28 |
| 3,152,194 | 10/1964 | Pohl | 55—64 |

NORMAN YUDKOFF, Primary Examiner

A. F. PURCELL, Assistant Examiner

U.S. Cl. X.R.

62—11, 20, 24, 26, 39, 27, 28; 260—679